United States Patent [19]

Tomita et al.

[11] Patent Number: 5,044,729

[45] Date of Patent: Sep. 3, 1991

[54] OBJECTIVE LENS ACTUATOR

[75] Inventors: Hironori Tomita; Tohru Nakamura, both of Katano; Noboru Kikuchi, Hirakata; Masanari Mohri, Katano, all of Japan

[73] Assignee: Matsushita Electric Industrial Co., Ltd., Osaka, Japan

[21] Appl. No.: 406,303

[22] Filed: Sep. 12, 1989

[30] Foreign Application Priority Data

Sep. 30, 1988 [JP] Japan .................................. 63-248115

[51] Int. Cl.$^5$ .............................................. G02B 7/02
[52] U.S. Cl. ................................. 359/824; 369/44.14; 359/814
[58] Field of Search ............... 350/255, 247, 257, 252; 369/44, 45, 46, 44.11, 44.14, 44.17, 44.19; 310/27

[56] References Cited

U.S. PATENT DOCUMENTS 4,554,653 11/1985 Malissin et al. ......................... 369/45
4,664,476 5/1987 Kasuga ................................. 350/247
4,838,649 6/1989 Ichikawa et al. ..................... 350/247

FOREIGN PATENT DOCUMENTS 57-210457 12/1982 Japan .

Primary Examiner—Bruce Y. Arnold
Assistant Examiner—Loha Ben
Attorney, Agent, or Firm—Stevens, Davis, Miller & Mosher

[57] ABSTRACT

An objective lens actuator is provided which is equipped with an actuating mechanism for actuating an objective lens mounted on a lens holder of an apparatus adapted to write or read information into or from a recording medium. The actuator moves the lens and its holder in two directions, one direction being substantially parallel to a surface of the recording medium such that the objective lens makes turning motion about a pivot axis oriented substantially normal to the surface of the recording medium and the other direction being vertical, with the lens and holder sliding vertically relative to the pivot axis. The actuator is equipped with at least one parallel driving coil for driving the movable section in the parallel direction and with at least one parallel driving magnetic circuit for imparting a magnetic flux to the parallel driving magnetic circuit. The actuator is arranged such that both drive forces, which are generated as a result of respective actions of electric currents flowing through at least two faces of the parallel driving coil and magnetic fluxes of the parallel driving magnetic circuit, constitute turning forces for turning the objective lens about an axis in the same rotational direction, thereby enhancing driving precision.

7 Claims, 4 Drawing Sheets

OBJECTIVE LENS ACTUATOR

BACKGROUND OF THE INVENTION

1. Field of the Invention

The present invention relates to an objective lens actuator for use in an apparatus for writing or reading information into or from a recording medium.

2. Statement of the Related Art

Generally, an information writing/reading apparatus employs a disk-shaped recording medium such as a compact disk, magneto-optical disk, etc. during operation. Such recording medium, however, has some degree of warpage and eccentricity and the apparatus is subjected to focussing deviations due to up-and-down motions due to warpage and is also subjected to tracking deviations due to eccentricity, etc of the recording medium. In order to correct such deviations, an objective lens actuator is arranged such that the objective lens is actuated along two axes. The direction of one axis is the direction of an optical axis (hereinafter referred to as "focussing direction F") perpendicular to the surface of a recording medium and the direction of the other axis is a radial direction (hereinafter, "tracking direction T") parallel to the surface of a recording medium. In general, however, the region over which the objective lens is moved in the tracking direction T is smaller than an information writing/reading region of the recording medium. For this reason, in order to effect writing and reading of information at a given position on the recording medium, the objective lens actuator as a whole is driven for recording medium accessing by a motor in the radial direction (the same direction as the tracking direction) of the recording medium. In addition, there has recently been an increasing demand in the art for reduction in size and thickness, enhancement in performance, and shortening of access time. Accordingly, it is also necessary that the objective lens actuator as a whole be made small in size and weight and be capable of operating with a high degree of efficiency.

Conventionally, an objective lens actuator of this type has a structure as shown in FIG. 6, which is disclosed in, for example, Japanese Patent Unexamined Publication No. 57-210457.

Namely, a magnet 26, first magnetic yokes 27a, 27b and second magnetic yokes 28a, 28b are provided on a base 9, to thereby form a magnetic circuit. This magnetic circuit generates magnetic fluxes. On the other hand, a focussing coil 6 is mounted on a lens holder 2 provided with an objective lens 1 and permits the passage therethrough of an electric current. A drive force is produced due to the actions of the above magnetic fluxes and electric current. Actuation of the objective lens 1 in the focussing direction F is effected by sliding motion of the lens holder 2 along a shaft 3 via a bearing 23, which sliding motion is caused to take place due to the action of said drive force. Further, tracking coils 5a to 5d are mounted on the lens holder 2, and each has coil surface 12d through which an electric current is allowed to pass. A drive force is produced due to the actions of the above-mentioned magnetic fluxes and this electric current. Actuation of the objective lens 1 in the tracking direction T is effected by turning motion of the lens holder 2 about the shaft 3 via the bearing, which turning motion is caused to occur due to said drive force. In addition, the objective lens actuator as a whole is driven for access by a motor in the access direction Ac (the same direction as the tracking direction T) on the recording medium.

In the objective lens actuator having a construction as shown in FIG. 6, however, the coil 6 for use in focussing is wound around the lens holder 2. For this reason, the magnetic fluxes, which are generated from the magnetic yokes 27a, 27b and the second magnetic yokes 28a, 28b, are arranged so as to be generated toward a center of the shaft 3. Accordingly, a face 12c of each of the tracking coils 5a to 5d must be located outside the magnetic circuit. In addition, the objective lens actuator is a planar type actuator. When it is desired to achieve thinning of the actuator as a whole, therefore, it is impossible to employ large effective coil length for obtaining a drive force acting in the tracking direction T. Thus, the use efficiency of the coil becomes low. Furthermore, positioning and fixing of the tracking coils onto the focussing coil 6 becomes difficult.

SUMMARY OF THE INVENTION

An object of the present invention is to provide an objective lens actuator in which tracking coil can be easily positioned and fixed and the effective coil length is long and which is capable of operating with a higher degree of efficiency.

In order to achieve the above-mentioned object, according to the invention, here is provided an objective lens actuator which is constructed as follows: Namely, an objective lens and a lens holder for holding the same constitutes a movable section. This movable section is made to turn about an axis in the tracking direction T. The movable section is equipped with one or more tracking drive coils for driving the movable section in the tracking direction T. On the other hand, the actuator has one or more tracking drive magnetic circuits for imparting magnetic fluxes to the tracking drive coils. The tracking drive coil has a plurality of faces. And drive forces are produced due to the respective actions of the electric currents running through at least two faces of the tracking drive coil and the magnetic flux generated from the tracking drive magnetic circuit. Thus, the tracking drive coil and the tracking drive magnetic circuit are so disposed that said drive forces may become turning forces in one and the same direction for causing the movable section to make a turning motion about the axis. Preferably, the dispositions of the tracking drive coil and the tracking drive magnetic circuit are such that, with the tracking drive coil having two faces substantially parallel to the axis, the magnetic flux from the magnetic circuit passing through one of such two faces passes therethrough in a direction substantially parallel to the tracking direction while, on the other hand, the magnetic flux from the magnetic circuit passing through the other of the above-mentioned two faces passes through the same in a direction substantially parallel to the tracking direction and in a direction substantially perpendicular to the focussing direction.

With the above-described construction, the drive forces which are produced in the two faces of the tracking coil can both be utilized as the drive forces acting in the tracking direction T. As a result, the effective coil length can be made longer with the result that the efficiency of utilizing the coil becomes high, thus enabling achieving the enhancement of the driving precision.

DESCRIPTION OF THE PREFERRED EMBODIMENTS

An objective lens actuator in accordance with a first embodiment of the present invention will now be described with reference to the drawings.

Figure 1A:
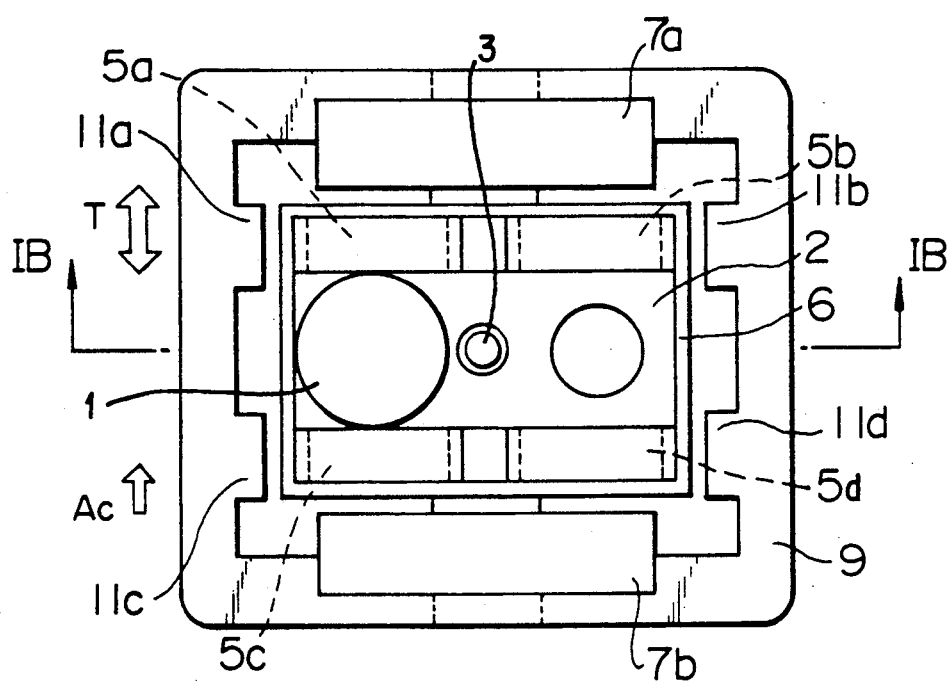
FIG. 1A is a front view of an objective lens actuator in accordance with a first embodiment of the present invention.
Figure 1B:
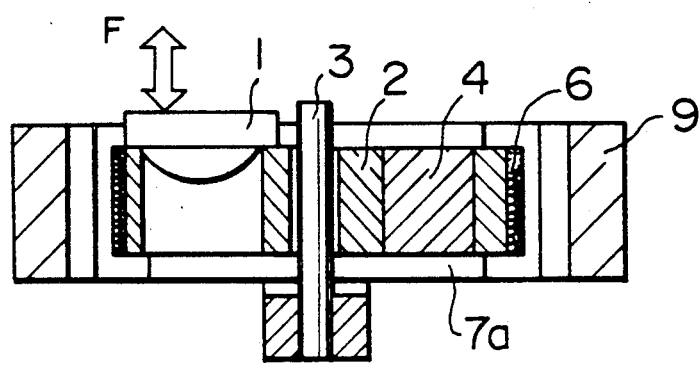
FIG. 1B is a sectional view taken along the line 1B—1B of FIG. 1A.

FIG. 1A is a front view of the first embodiment of the present invention; FIG. 1B is a sectional view taken along the line 1B—1B of FIG. 1A; and FIG. 2 is a front view of an essential portion of the FIG. 1A shown objective lens actuator, illustrating the actuation of an objective lens in the tracking direction.

As shown in FIGS. 1A and 1B, an objective lens 1 is mounted on a lens holder 2. The objective lens actuator is equipped with a base 9 having an annular portion. Inside this annular base portion, there are provided focussing magnets 7a, 7b and a focussing coil 6, the focussing magnets 7a, 7b generating magnetic fluxes and the focussing coil having an electric current allowed to pass therethrough. A drive force is produced due to respective actions of such magnetic fluxes and electric current. Driving or actuation of the objective lens in the focussing direction F is effected by sliding motion thereof along a shaft 3 having one end fixed on the base 9, which sliding motion is caused to take place due to the action of said drive force. The objective lens actuator has tracking coils, which has a square cartridge-like sectional shape as indicated by, for example, coil 5c in FIG. 3. The tracking coils are mounted on a movable section composed of the objective lens 1 and the lens holder 2 so that two opposite faces 12c and 12d may become substantially parallel to the focussing direction F and so that the four tracking coils 5a to 5d (shown in FIG. 1A) may be arranged substantially symmetrical with respect to the shaft 3. In addition, the four tracking coils are so arranged that the center of gravity of the whole movable section may be brought to lie substantially on an axis of the shaft 3 by a balance weight. As shown in FIG. 2, a face 12c of the tracking coil 5c causes generation of a drive force F1 due to respective actions of a magnetic flux B1 generated from an opposing focussing magnet 7b and an electric current I1 (which runs upwards in a direction orthogonal to the drawing sheet surface) running through the face 12c. On the other hand, a face 12d causes generation of a drive force F2 due to respective actions of a magnetic flux B2 collected or converged by an opposing tracking drive magnetic yoke 11c and an electric current I2 (which runs downwards in a direction orthogonal to the drawing sheet surface) running through the face 12d. The lens holder 2 equipped with the objective lens 1 is caused to make a turning motion about the shaft 3 by the respective actions of the drive forces F1 and F2 applying a mechanical moment acting in the same direction, whereby actuation in the tracking direction T is effected. At the same time, the objective lens actuator as a whole is driven for access by a motor in the access direction Ac (the same direction as the tracking direction T) on a recording medium.

Figure 2:
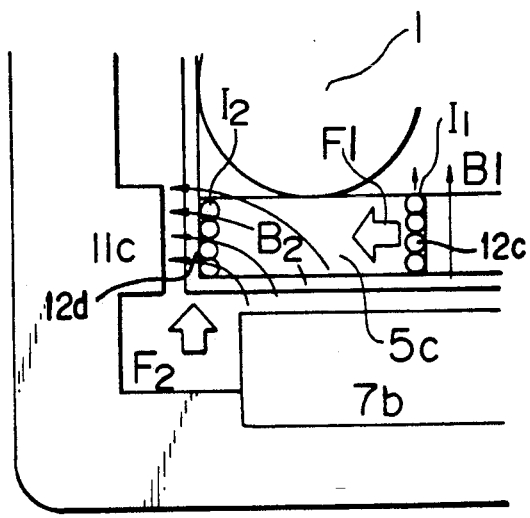
FIG. 2 is a front view of an essential portion of the objective lens actuator shown in FIG. 1, illustrating the manner in which an objective lens thereof is actuated.
Figure 3:
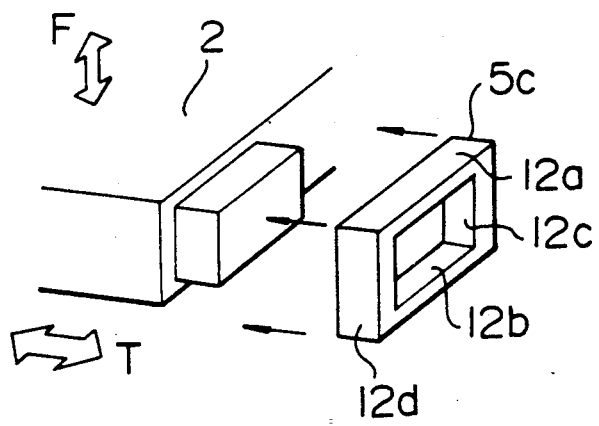
FIG. 3 is a perspective view of an essential portion of the objective lens actuator in accordance with the first embodiment of FIG. 1A, illustrating the manner in which a tracking coil thereof is attached.

By providing such a magnetic circuit arrangement as shown in FIG. 2, it is possible to utilize both of the drive forces generated from the two opposing faces of the tracking coil, as the drive forces in the tracking direction T, thereby enabling enhancement of the driving precision. Further, as shown in FIG. 3, the tracking coil is wound in the form of a cartridge. Therefore, if a part of the lens holder is made into the form of a cartridge capable of being fitted into the tracking coil, this tracking coil can be easily positioned and fixed on lens holder 2 and in addition the adherence between the two will increase. At the same time, since the actuator is not a planar type actuator, the effective coil length for obtaining the drive force in the tracking direction T can be made longer with a result, that the utilization efficiency of the coil is improved.

In addition, since the actuation or driving in the focussing direction F and the actuation or driving in the tracking direction T can be effected by use of the same magnetic circuit, it is possible to achieve a reduction in the number of necessary component parts and an overall miniaturization of the actuator.

Figure 4:
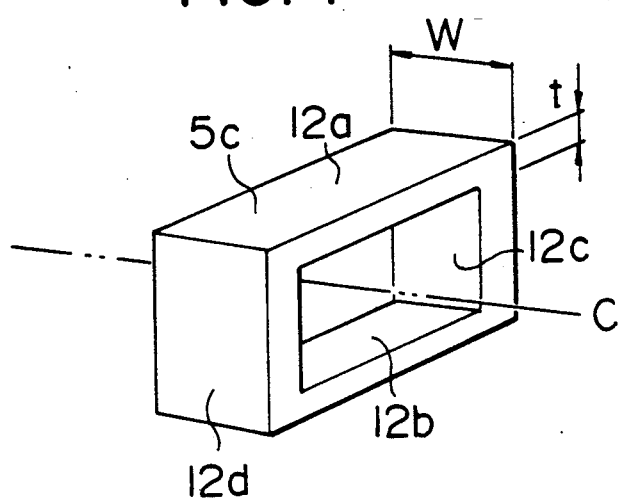
FIG. 4 is a perspective view of an essential portion of the objective lens actuator in accordance with the first embodiment, illustrating a configuration of the tracking coil thereof.

It is to be noted that the terminology substantially "cartridge"-shaped tracking coil is defined to mean one which bears a relationship of $W > t$, where t represents the width of one side of a section, as taken normal to an axis C, of a tracking coil 5c wound around the axis C and W represents the thickness of one side as taken along the axis C, as shown in FIG. 4.

Next, the objective lens actuator in accordance with a second embodiment of the present invention will be described with reference to the drawings.

Figure 5A:
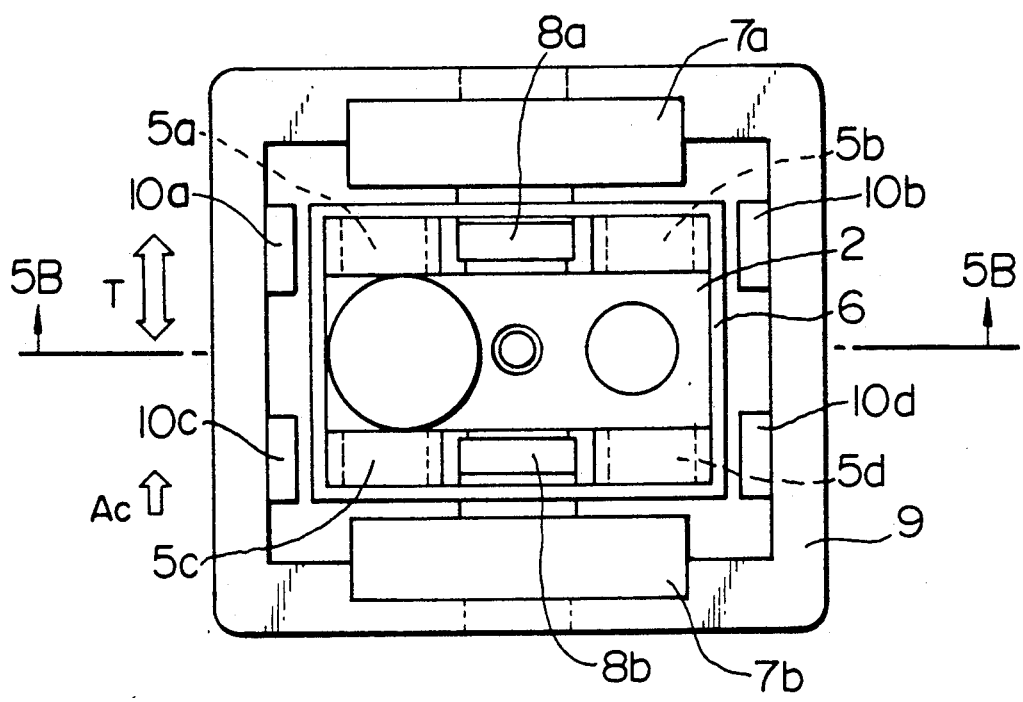
FIG. 5A is a front view of an objective lens actuator in accordance with a second embodiment of the present invention.
Figure 5B:
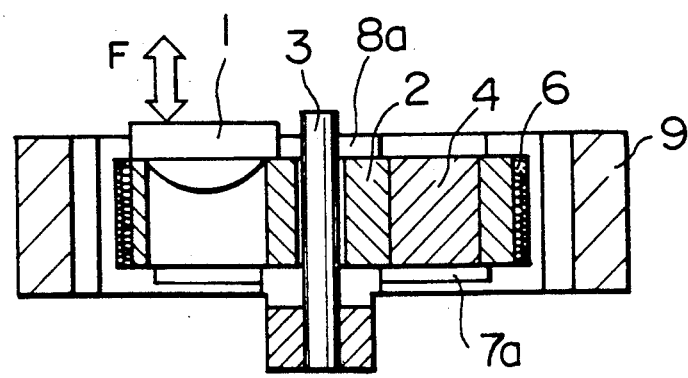
FIG. 5B is a sectional view taken along the line 5B—5B of FIG. 5A.
Figure 6:
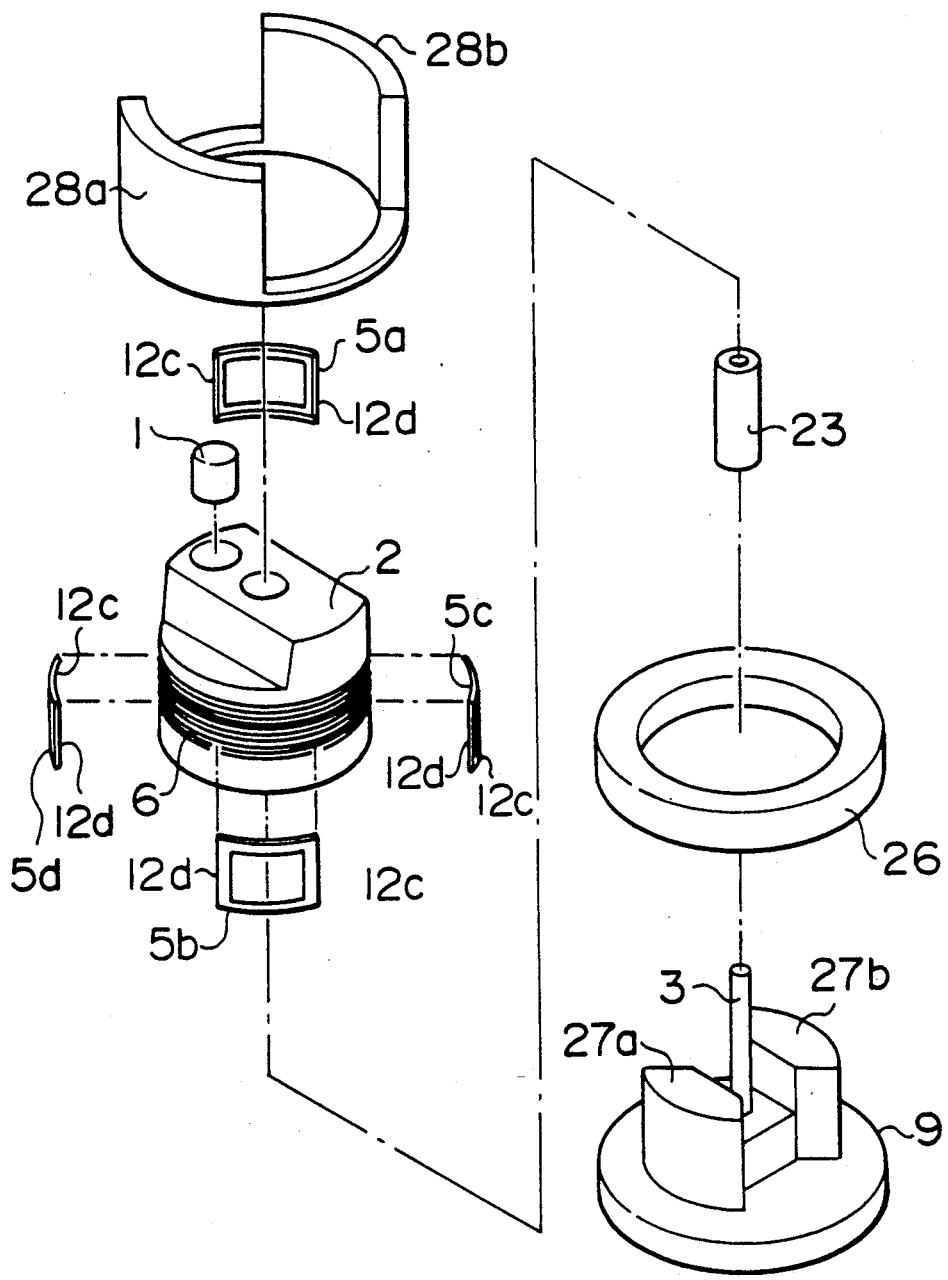
FIG. 6 is a perspective exploded view of a conventional objective lens actuator.

FIG. 5a is a front view of an objective lens actuator in accordance with the second embodiment of the present invention; and FIG. 5B is a sectional view taken along the line 5B—5B of FIG. 5A.

As shown in FIG. 5A focussing magnets 7a, 7b and magnetic yokes 8a, 8b are provided inside an annular portion of a base 9 equipped to the objective lens actuator, and function to generate magnetic fluxes. On the other hand, a focussing coil 6 also is provided inside the annular portion of the base 9, and has an electric current allowed to pass therethrough. Thus, a drive force is produced due to respective actions of said magnetic fluxes and electric current. Thus, actuation in the focussing direction F is effected by sliding motion along a shaft 3 having one end fixed to the base 9, which sliding motion is caused to take place due to the above-mentioned drive force. The tracking coil, as indicated by 5c in FIG. 3, has its section shaped like a square cartridge. As in the case of the first embodiment, the tracking coils are mounted on a movable section composed of the objective lens 1 and the lens holder 2 so that two opposite faces 12c and 12d of each tracking coil may become substantially parallel to the focussing direction F and so that the four tracking coils 5a to 5d (shown in FIG. 1A) may be arranged substantially symmetrical with respect to a shaft 3. In addition, the whole movable section is so arranged that the center of gravity thereof may be brought to lie substantially on an axis of the shaft 3. A face 12c of the tracking coil 5c causes generation of a drive force F1 due to a magnetic flux B1 generated from an opposing focussing magnet 7b and from an electric current I1 (which runs upwards in a direction orthogonal to the drawing sheet surface) running through the face 12c. A face 12d causes generation of a drive force F2 due to a magnetic flux B2 generated from an opposing tracking magnet 10c and from an electric current I2 (which runs downward in a direction orthogonal to the drawing sheet surface) running through the face 12d. The actions of these drive forces F1 and F2 act in the same rotary direction upon lens holder 2 equipped with the objective lens 1 to cause them to make a turning motion about the shaft 3, whereby actuation in the tracking direction T is effected. And in addition, the objective lens actuator as a whole is driven for recording medium accessing by a motor in the access direction Ac (the same direction as the tracking direction T) on the recording medium.

In the second embodiment, the density of the magnetic fluxes generated from the focussing magnets 7a, 7b and the tracking magnets 10a to 10d is greater than that in the the first embodiment. This makes it possible to enhance the driving precision of the objective lens.

In addition, the direction in which the magnetic fluxes are generated from the focussing magnets 7a, 7b is opposite to that in which the magnetic fluxes are generated from the tracking magnets 10a to 10d, with respect to the objective lens. If, therefore, each one, or both, of said magnetic fluxes are adjusted so as to make the magnetic fluxes on the recording medium substantially zero, no undesirable effect occurs during a recording operation even in the case of a recording medium adapted to effect magneto-optical recording of information, such as a magneto-optical disk.

What is claimed is:

1. An objective lens actuator for actuating a movable section of an apparatus for writing or reading information into or from a recording medium, said movable section comprising an objective lens and a lens holder for holding said objective lens, said movable section making turning motion about an axis adapted to be oriented substantially normal to a reading/writing surface of said recording medium, said actuator comprising:

an actuating mechanism for actuating said objective lens to make said turning motion about said axis, said actuating mechanism comprising:

a parallel driving coil to be mounted on said movable section and having a plurality of coil faces;

a parallel driving magnetic circuit means for imparting a magnetic flux to said parallel driving coil;

said parallel driving coil and said parallel driving magnetic circuit means being disposed relative to one another to produce at least first and second drive forces responsive to respective actions of electric current passing through at least two faces of said coil faces of said parallel driving coil and at least a first and a second portion of the magnetic flux generated from said parallel driving magnetic circuit means and passing through said two faces of said parallel driving coil such that said first and second drive forces both provide turning forces acting in the same rotational direction for causing said turning motion about said axis;

wherein said two faces of said parallel driving coil are oriented substantially parallel to said axis; and wherein said parallel driving coil is wound around an axis into a substantially square hollow block shape which bears a relationship of $W > t$, where t represents the width of one side of said square hollow block shape with respect to a section thereof along a direction normal to said axis of said parallel driving coil and W represents the width of said one side thereof along a direction of said axis of said parallel driving coil.

2. An objective lens actuator as claimed in claim 1, wherein said parallel driving magnetic circuit means comprises at least two parallel driving circuits which are disposed substantially symmetrically with respect to a plane including said axis.

3. An objective lens actuator as claimed in claim 1, wherein when the first and second portions of the magnetic flux of said magnetic circuit means pass through said two faces of said parallel driving coil, said first portion of said magnetic flux passes through one of said two faces substantially in parallel with the turning direction of said objective lens and said second portion of said magnetic flux passes through the other of said two faces substantially in parallel with said surface of said recording medium and in a direction substantially perpendicular to said turning direction.

4. An objective lens actuator as claimed in claim 1, wherein said lens holder is provided with a rectangular-parallelepiped like projection on which said parallel driving coil is fitted and positioned on said lens holder.

5. An objective lens actuator as in claim 1, wherein said parallel driving magnetic circuit means comprises a magnet disposed opposite to one side of said driving coil and a magnetic yoke offset laterally relative to said driving coil and said magnet.

6. An objective lens actuator for actuating a movable section of an apparatus for writing or reading information into or from a recording medium, said movable section including an objective lens and a lens holder for holding said objective lens, said movable section making turning motion about an axis adapted to be oriented normal to a read/write surface of said recording medium, said actuator comprising:

an actuating mechanism for moving said objective lens in two directions, one substantially in parallel with said surface of said recording medium and the other substantially vertical with respect thereof, said actuating mechanism comprising:

a parallel driving coil to be mounted on said movable section and having a pair of coil faces;

a parallel driving magnetic circuit for imparting a magnetic flux to said parallel driving coil;

at least one vertical driving coil for driving said movable section in said substantially vertical direction; and at least one vertical driving magnetic circuit for imparting a magnetic flux to said vertical driving coil, whereby the magnetic flux generated from said parallel driving magnetic circuit passes through one of said two faces while the magnetic flux generated from said vertical driving magnetic circuit passes through the other of said two faces, such that first and second drive forces are produced responsive to respective actions of electric current passing through said two faces of said parallel driving coil and first and second portions of the magnetic flux passing through said two faces, whereby said first and second drive forces cooperate to cause said turning motion about said axis in a same rotational direction, and such that a focusing force is produced responsive to electric current passing through said at least one vertical driving coil and the magnetic flux generated from said at least one vertical driving magnetic circuit and passing through said at least vertical driving coil;

wherein said two faces of said parallel driving coil are oriented substantially parallel to said axis; and wherein said parallel driving coil is wound around an axis into a substantially square hollow block shape which bears a relationship of $W > t$, where t represents the width of one side of said square hollow block shape with respect to a section thereof along a direction normal to said axis of said parallel driving coil and W represents the width of said one side thereof along a direction of said axis of said parallel driving coil.

7. An objective lens actuator as claimed in claim 6, wherein the magnetic flux of one of said parallel driving magnetic circuit and said vertical driving magnetic circuit is adjusted such that a total sum of said magnetic fluxes generated from said parallel driving magnetic circuit and said vertical driving magnetic circuit is substantially zero at an optical spot on said recording medium onto which light is focussed by means of said objective lens.

* * * * *